US006757216B1

(12) United States Patent
Varnai et al.

(10) Patent No.: US 6,757,216 B1
(45) Date of Patent: Jun. 29, 2004

(54) METHOD FOR POST PROCESSING COMPENSATION OF AMPLITUDE FOR MISALIGNED AND MISSTACKED OFFSET SEISMIC DATA

(75) Inventors: Peter Varnai, Houston, TX (US); Stefan Hussenoeder, Sugar Land, TX (US); Brian P. West, Houston, TX (US); John E. Eastwood, Bellaire, TX (US); Spyridon K. Lazaratos, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 5 days.

(21) Appl. No.: 10/438,540

(22) Filed: May 15, 2003

(51) Int. Cl.[7] ............................. G01V 1/36; G06F 19/00
(52) U.S. Cl. .............................. 367/47; 367/52; 367/59; 367/49; 702/14; 702/17
(58) Field of Search ............................. 367/47, 52, 59, 367/49; 702/14, 17

(56) References Cited

U.S. PATENT DOCUMENTS

| | | | | |
|---|---|---|---|---|
| 4,554,649 A | * | 11/1985 | Herkenhoff et al. | 367/68 |
| 4,570,246 A | * | 2/1986 | Herkenhoff et al. | 367/68 |
| 4,980,866 A | * | 12/1990 | Wang et al. | 367/52 |
| 4,992,996 A | * | 2/1991 | Wang et al. | 367/53 |
| 6,266,620 B1 | * | 7/2001 | Baeten et al. | 702/17 |
| 6,516,275 B2 | * | 2/2003 | Lazaratos | 702/17 |
| 2002/0141287 A1 | * | 10/2002 | Lazaratos | 367/120 |
| 2003/0043693 A1 | | 3/2003 | Eastwood et al. | 367/41 |

OTHER PUBLICATIONS

Herrmann et al, Statistictly uncorrelated AVO attributes, Jun. 15, 2001, 63rd EAGE Conference, vol. 2, paper No. p–187, 4 pages.*

Mukerji et al, Near and far offset impedances, Geophysical Res. Letters, vol. 25, pp. 4557–4560, Dec. 15, 1998.*

De Groot, P. F. M., Volume transformation, by way of Neural network mapping, 61st EAGE Conference, Jun. 11, 1999, Paper No. 3–37.*

Nada et al, Evaluating geophysical lithology determination, 64th Annual SEG int. meeting, Oct. 28, 1994, pp 1112–1113, paper No. SL2.*

"*Encyclopedic Dictionary of Exploration Geophysics*", Third Ed., R. E. Sheriff, Society of Exploration Geophysicists, (1994), Figs. D–15 (e–m).

* cited by examiner

*Primary Examiner*—Nelson Moskowitz
(74) *Attorney, Agent, or Firm*—J. Paul Plummer

(57) ABSTRACT

A method for assessing the suitability of seismic data for quantitative amplitude analysis, where the concern is excessive residual normal moveout (RNMO). The invention uses a near offset stack and a far offset stack, the time difference between the two, a mute pattern, a reflection shape assumption for the RNMO, and a waveform and frequency for the far stack traces to generate a formula that estimates far stack amplitude error caused by RNMO. The formula can be used to compensate the far stack amplitude where the error is not so great as to require reprocessing of the data. The method can also be applied to interpreted amplitude maps.

11 Claims, 6 Drawing Sheets

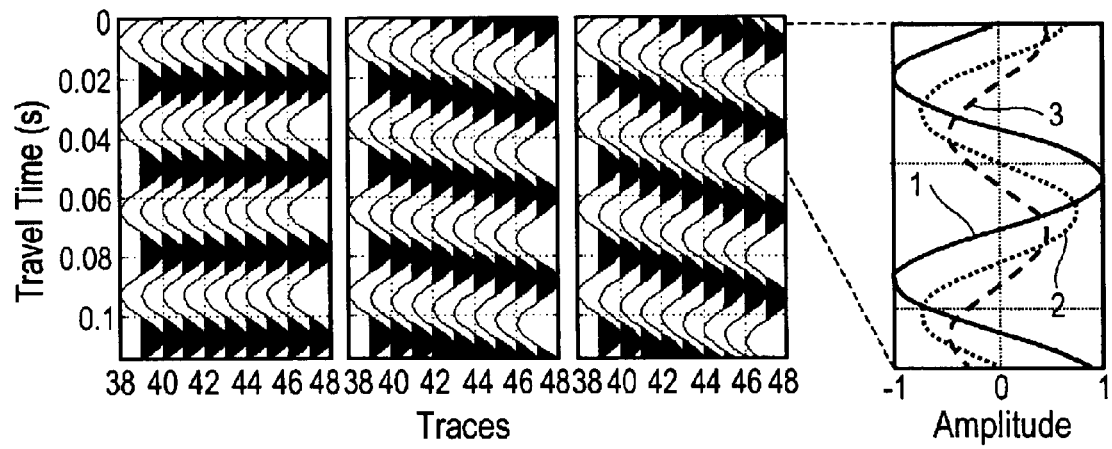
FIG. 1A FIG. 1B FIG. 1C FIG. 1D
(PRIOR ART) (PRIOR ART) (PRIOR ART)
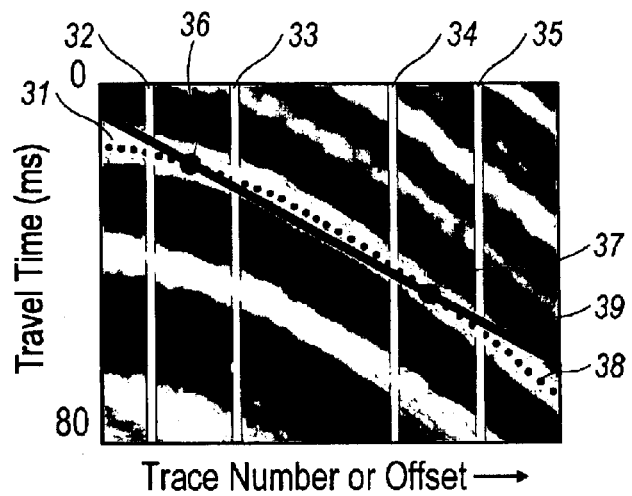
FIG. 3

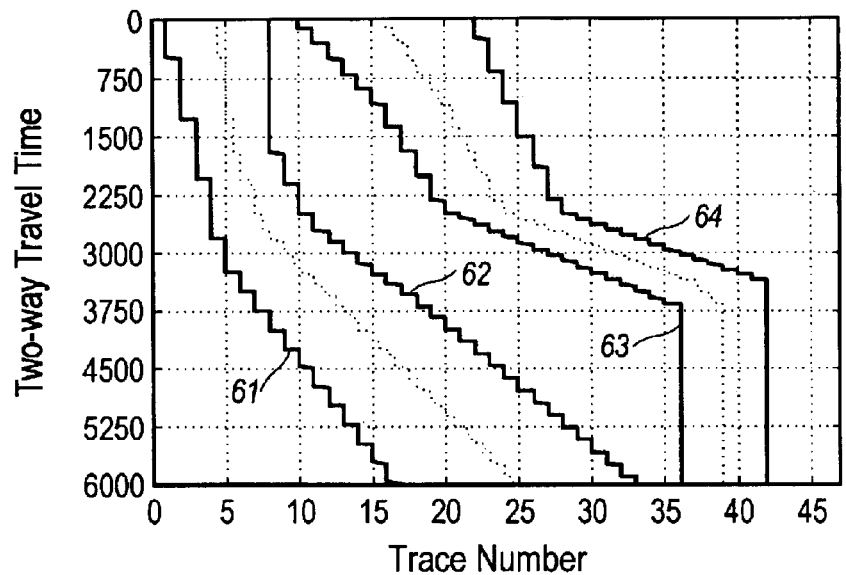
FIG. 6
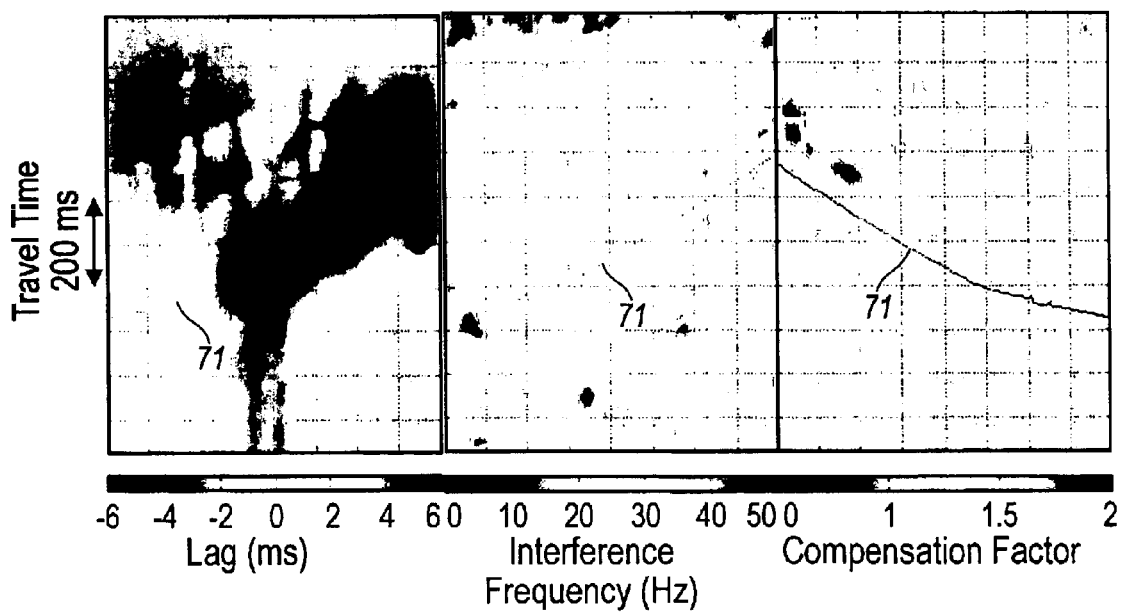
FIG. 7A   FIG. 7B   FIG. 7C

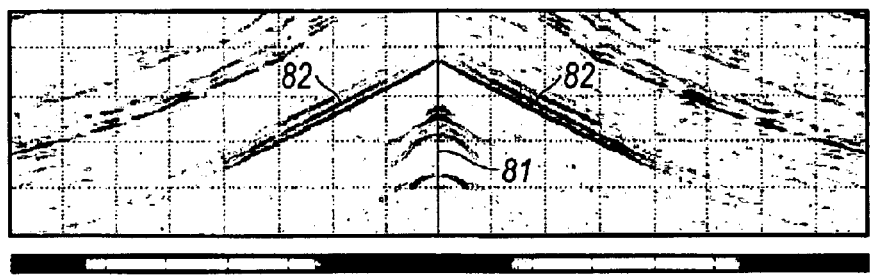
FIG. 8
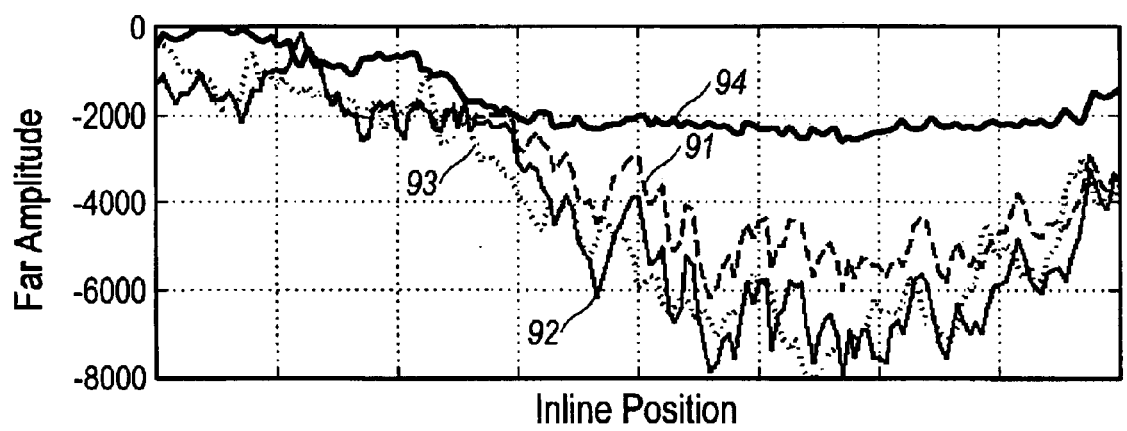
FIG. 9
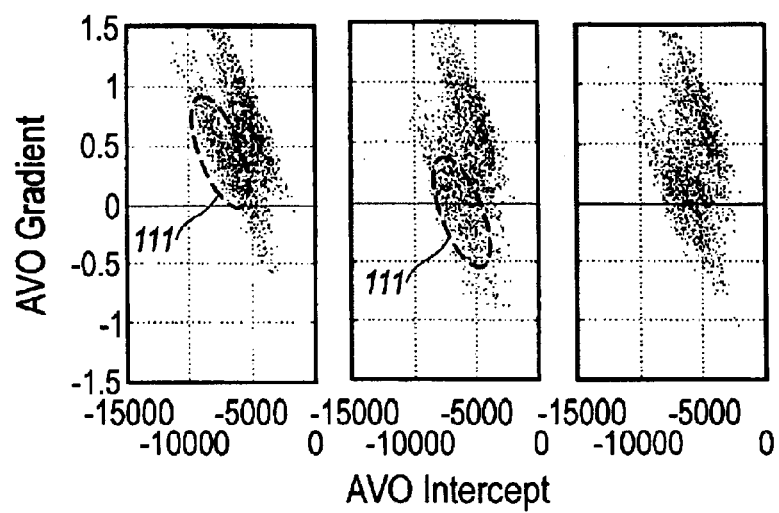
FIG. 11A  FIG. 11B  FIG. 11C

METHOD FOR POST PROCESSING COMPENSATION OF AMPLITUDE FOR MISALIGNED AND MISSTACKED OFFSET SEISMIC DATA

FIELD OF THE INVENTION

This invention relates generally to the field of seismic prospecting and, more particularly, to seismic data processing and interpretation. Specifically, this invention improves the ability of geoscientists to perform quantitative AVO (Amplitude Versus Offset) analysis on seismic data for exploration, development and production scenarios by allowing the interpreter to correct post-processed seismic amplitudes that are corrupted due to the stacking of non-flat gathers. The corrected amplitudes allow accurate construction and manipulation of AVO attributes.

BACKGROUND OF THE INVENTION

In many settings, hydrocarbons can be directly detected from seismic data by a trained observer. Where hydrocarbons are present, the density and velocity of a typical reservoir is reduced, which in most cases increases the magnitude of the reflection coefficient and hence the resulting seismic reflection amplitudes. The effect can often be seen as a bright spot on routinely processed seismic data. Such bright spots are one type of direct hydrocarbon indicator, or "DHI". DHI is the name given to nearly any characteristic of seismic data that is sensitive to, and often diagnostic of, fluid type. Conventional DHIs are those that can be found in conventionally processed seismic data, i.e., full or near-offset stacks.

DHIs have several limitations. First, high porosity in the reservoir is necessary if reflection coefficients are to be increased to the detectable threshold. Sandstones at depths greater than ten thousand feet and carbonate reservoirs at any depth seldom have such porosity. Second, the difference in velocity and density between water and oil may be slight, and free gas may be required to produce DHIs in many geologic settings. Unfortunately, a small amount of gas has the same amplitude effect as a large amount, and many wells drilled on DHIs produce only fizz water. Most importantly, the presence of hydrocarbons is only one of a great many things that can cause amplitude and phase changes in seismic reflections.

One method of overcoming the limitations of conventional DHIs is to analyze prestack (or multi-offset/multi-angle) seismic data. When a compressional wave impinges obliquely on an interface, part of the energy is converted into shear waves. Since the amount of energy that is converted to shear waves depends on the angle of incidence (or offset, the horizontal distance between seismic source and receiver), compressional reflection amplitude also depends on angle or offset. This is the basis for AVO analysis.

AVO depends strongly on pore-fluid type and amount, as well as on the type of rocks above and below the reflecting interface. From a geophysical perspective, AVO is determined by contrasts in impedance and Poisson's ratio or ratio of P-wave to S-wave velocity. Class 1 reservoirs have a high impedance contrast, class 2 reservoirs have a near-zero impedance contrast, and class 3 reservoirs have a low impedance contrast. By exploiting more than one physical property of the reservoir, one can extract reservoir information that is not contained in conventional DHIs extracted from fully stacked data.

A difficulty with AVO analysis is the need to analyze more information than simply the stacked data. The process is often simplified by fitting AVO signatures or curves with a line and then working with only that line's slope and intercept. Since two points describe a line, AVO analysis may be performed on two partial stacks of the seismic data, one at far offsets and one at near offsets. Each partial stack combines several, adjacent seismic traces with a common mid-point but different, consecutive offsets. The far and near stacks give two points from which a linear amplitude relationship with offset may be estimated.

Accurate seismic information is critical for quantitative AVO analyses. However, even with a state-of-the-art AVO processing stream, non-flat gathers, due to inadequate normal moveout correction, may have been stacked to form partial stack seismic data (i.e. near and far stack volumes). (When reflections with different offsets but from the same reflector point are combined [stacked], a correction called the normal moveout correction must be made to compensate for the different travel times caused by the different path lengths.) This sub-optimal stacking manifests itself in many ways. The offset stack volumes are not aligned in time, and seismic amplitudes are reduced due to the destructive interference of traces within the partial stack.

This effect is illustrated in FIGS. 1A–1D using synthetically generated seismic traces. FIGS. 1A, 1B and 1C each depict a gather of nine traces (traces No's. 39 through 47) having a common reflection point, each figure with a different amount of residual normal moveout ("RNMO") and representing traces that might be stacked to form a far (partial) stack. The nine traces are plotted sequentially vs. depth as measured by the travel time for seismic wave propagation in the medium. Normal moveout ("NMO") correction has already been applied to these data, as a seismic processing step. The NMO correction is key to the efficiency of common mid-point stacking. The recorded travel time for each trace depends on its offset. The greater the offset, the farther the energy must travel from source to receiver, and hence the greater the travel time. The NMO correction is a processing step intended to adjust the two-way travel time of reflections in each trace to be the same as that of its corresponding zero-offset trace. The NMO correction is calculated using the travel times for a given offset and a known or assumed seismic wave velocity. In practice, the effectiveness of the NMO correction varies, and residual normal moveout (RNMO) is a measure of the amount of under- or over-correction.

In FIG. 1A, the NMO correction is perfect. The peaks and troughs from each trace are aligned at the same depth, or vertical travel time, as indeed they should after normal moveout correction because they represent reflections from the same subterranean point. The perfectly flat reflections of FIG. 1A have 0 milliseconds (ms) RNMO.

FIGS. 1B and 1C show cases where the seismic processing has not fully flattened the data. In FIG. 1B, trace No. 47 images the reflections approximately 0.01 seconds, or 10 ms, deeper than trace No. 39. In FIG. 1C, the difference is approximately 16 ms. Thus, RNMO=10 Ms for FIG. 1B, and RNMO=16 ms for FIG. 1C.

FIG. 1D shows an expanded view of the normalized stacked amplitude for each of the three RNMO cases, covering the travel time range 0 ms to approximately 47 ms. Curve 1 represents the normalised sum of the traces in FIG. 1A, curve 2 corresponds similarly to FIG. 1B, and curve 3 corresponds to FIG. 1C, with the amplitude being progressively smaller because of increasing destructive interference (cancellation) between traces at increasing RNMO. Only curve 1 has preserved the correct amplitude. The other two curves have smaller amplitudes than they should, due to inadequate flattening (NMO correction) of the seismic data. In addition to reduced amplitudes, curves 2 and 3 also suffer from phase delay compared to curve 1.

Because travel times are greater at large offsets, the corresponding NMO corrections are also greater. Greater NMO corrections tend to produce greater RNMO, and consequently the resulting amplitude distortion tends to be greater for the far stack than for the near stack.

The seismic interpreter typically receives a far and a near stack volume of data from the seismic processor. The interpreter also gets "mute window" information, which is the description of which traces are included in the two partial stacks and at what travel times, e.g., trace No's. 39–47 in the far stack example of FIGS. 1A–1D. Due to data handling and storage limitations, the interpreter receives little else from the volumes of seismic data that are originally acquired. Currently, there is no established method for assessing how much RNMO amplitude error exists in the partial stack data. Even if this error somehow could be assessed, the only recourse currently in the case of flawed data would be to request reprocessing of the data, an expensive measure to undertake. The present inventive method allows the interpreter to make a quality control assessment of partial stack data, and, for moderate amounts of error, actually correct the associated amplitudes without reprocessing in order to proceed with quantitative analysis such as AVO.

SUMMARY OF THE INVENTION

In one embodiment, the present invention is a method for estimating amplitude error in a far-offset partial stack of seismic data due to inadequate normal moveout correction, given a near-offset partial stack and the mute pattern used to define the near and far stacks. First, the time difference between the near stack and the far stack is calculated. Then, a reflection shape approximation for the residual normal moveout is selected. Using the mute pattern and the results of the first two steps, time differences between individual traces in the far stack and the far stack trace are calculated. Next, a waveform and frequency representative of the far stack traces is determined. Then, the previous information is used to determine a formula that yields the amplitude compensation factor, and hence the amplitude error, for the far stack amplitude.

The amplitude error calculated by the present inventive method provides the seismic interpreter with a quality control tool to use preceding AVO analysis or other applications sensitive to amplitude accuracy. If the error is greater than approximately 50%, the data may have too much RNMO to be corrected by anything other than reprocessing of the data. For lesser amplitude errors, the amplitude error estimates from the present invention may be used to compensate the far stack amplitudes without reprocessing of the data.

The present inventive method may also be used to correct or QC seismic data in the form of interpreted amplitude maps.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which:

FIGS. 1A, 1B and 1C shows synthetic seismic traces representing a typical far mute window with three different amounts of residual normal moveout (RNMO);

FIG. 1D shows the normalized stacked amplitude response for each of the three sets of traces 1A, 1B and 1C;

FIG. 3 shows a synthetic seismic gather with large RNMO;

FIG. 6 shows the near and far stack mute patterns used in FIG. 5;

FIGS. 7A, 7B and 7C show a cross-section of the data volumes from FIG. 5 for the near-to-far time difference or lag (7A), the calculated interference frequency for the far volume (7B), and the calculated compensation or correction factor for the far stack (7C);

FIG. 8 compares the original far and compensated far stack sections of the seismic line shown in FIG. 5;

FIG. 9 shows amplitude values extracted along an inline from the top of a reservoir reflection, comparing reprocessed, compensated (by the present invention), and original data from the example of FIG. 5;

FIGS. 11A, 11B and 11C are top-of-reservoir AVO cross-plots for the three data sets (original, compensated and reprocessed) from the example's small test area.

Figure 2:
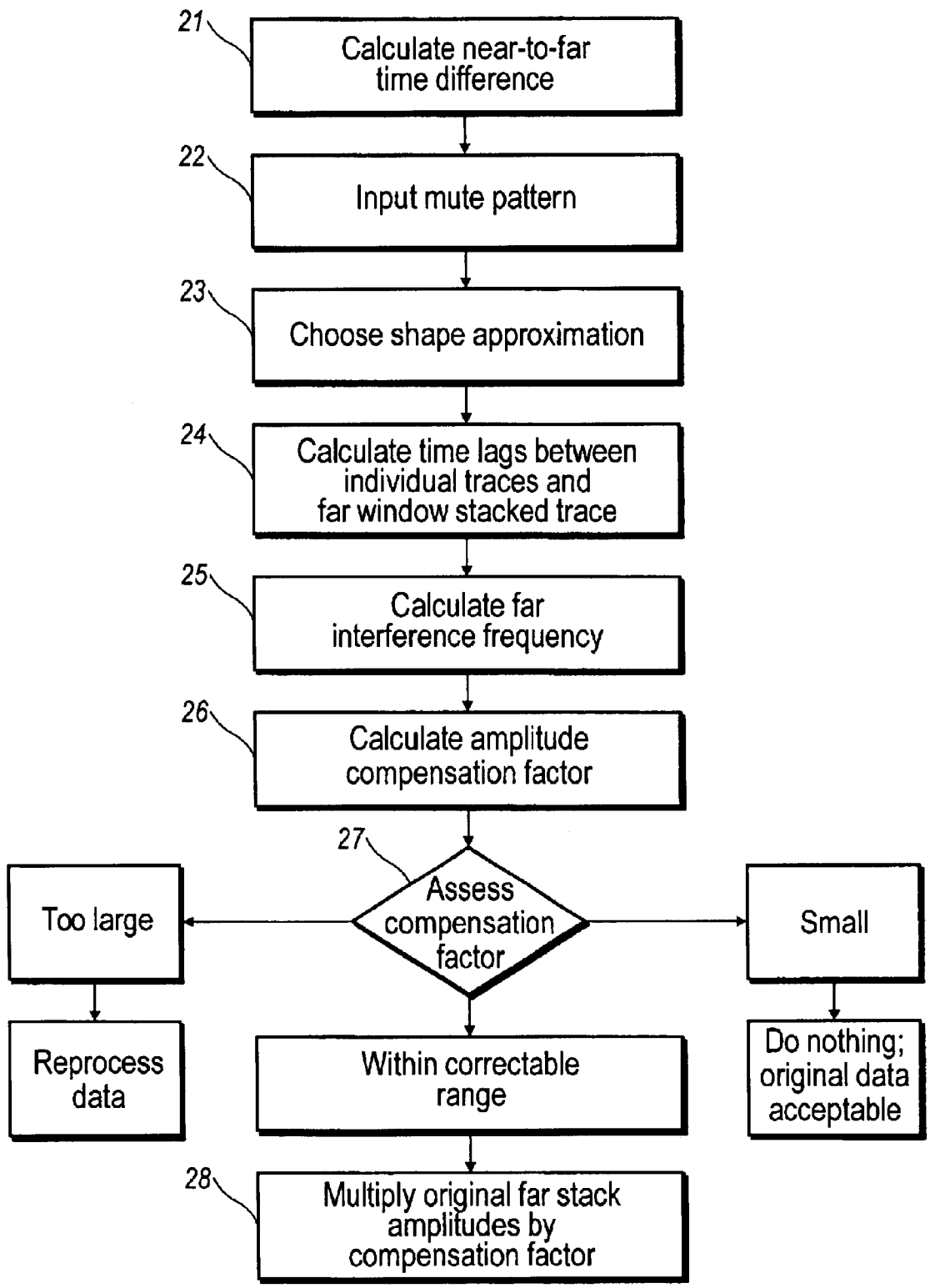
FIG. 2 is a flowchart illustrating the basic steps of the present inventive method.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents which are included within the spirit and scope of the invention, as defined by the appended claims.

DETAILED DESCRIPTION OF THE PREFERRED EMBODIMENTS

The present invention is a method for correcting the amplitude of a partial stack of seismic data for RNMO error, using only two reference points—a near-stack amplitude and travel time and a far-stack amplitude and travel time—plus mute window information ("mute pattern"). Some embodiments of the invention may be described with reference to the flow chart of FIG. 2. With minor modifications, the present invention may also be used to correct amplitude maps as contrasted with correcting the seismic data as discussed above. An amplitude map is prepared by a person, commonly called a seismic interpreter, from an examination of seismic data. For example, the interpreter may conclude that the top of a reservoir stands out enough in the data that he can mark it on a spatial depiction of the seismic amplitude data. Such an amplitude map may be corrected for RNMO by using similarly derived information from the near and far stacks. The map-based approach will sometimes be called the "horizon mode" of the invention as opposed to the "volume mode" (correcting the underlying seismic data). The description that follows will be in the context of the volume mode. In those few steps where the horizon and volume modes differ, the differences will be noted. Data volumes, amplitude maps and horizons are familiar concepts to seismic interpreters. Excellent illustrations of such displays can be found in the *Encyclopedic Dictionary of Exploration Geophysics*, Third Ed., R. E. Sheriff, Society of Exploration Geophysicists, 1994, FIGS. D-15(*e–m*).

The approach of the present invention is to use the information typically given to the seismic interpreter, and from that to calculate an amplitude compensation factor which can then be used to correct thee far-stack amplitude for RNMO. (The near-stack amplitude may be corrected in the same way if deemed necessary.) It is part of the present invention that such compensation factors can be calculated from the following quantities: (1) the number of traces in the far mute window; (2) the periodic frequency that best fits the seismic traces in the far mute window; and (3) the time lag between each individual trace and a reference trace in the far mute window. The interpreter directly knows the number of traces in the far mute; that is part of the far mute pattern information that is given to him. It is part of the present invention to show how the seismic frequency and the individual trace lags can be estimated from the data given the interpreter.

FIG. 3 shows a synthetic seismic gather with large RNMO after NMO flattening. The white curved band 31 is interpreted to be the top-of-reservoir reflection. The vertical axis represents depth, or distance travelled, in terms of travel time for the seismic wave. (Thus, travel time can be considered a "proxy" for depth.) The reservoir top 31 is not imaged at a constant depth because of RNMO. The horizontal axis represents trace number, which is a proxy for offset. The vertical lines 32 and 33 delineate the near mute window, and the lines 34 and 35 the far mute window. Besides the mute pattern, the interpreter has amplitude information for only the sum of the traces in the near mute window and the sum of the traces in the far mute window. From the mute pattern, the interpreter knows the number of traces that went into each partial stack, and their angle or offset values. Shown in FIG. 3 but not supplied to the interpreter is the travel time difference of this reflection event between the near partial stack 36 and the far partial stack 37 i.e. the near-far time lag due primarily to RNMO.

At step 21 of FIG. 2, this time alignment difference is calculated from any information the interpreter may have. A preferred method for calculating the time lag in the volume mode has been known to the person of ordinary skill in the art since the publication of "*Method for Time-Aligning Multiple Offset Data Volumes*" by Eastwood, et al. (U.S. patent application Publication No. U.S. 2003/0043693 A1, Mar. 6, 2003). A summary of this method follows:

First, one selects a set of time shifts, chosen to cover a range of time shifts within which the to-be-determined result can reasonably be expected to lie. For example, one might select 15 ms, 20 ms, and 25 ms. Then, the near and far seismic data volumes are cross-correlated at each of these time shifts. An initial time-shift volume and a maximum correlation volume are created from the time shifts that exhibit the best correlation on a point-by-point basis. Next, the initial time shift data volume is preferably filtered to remove suspect data, e.g., large time shifts and/or low cross correlations. Each number in this filtered time-shift volume is the near-to-far travel time difference at each location in the subsurface. In a variation of the Eastwood method, previously interpreted seismic horizons are used to constrain time alignment of the far-offset data volume.

In an embodiment of the horizon mode of the present invention, the near-to-far time lag may be directly taken from the time differences between near and far interpreted horizons, readily obtained by superimposing the near stack and far stack maps showing two-way travel time as contours, and noting time differences at corresponding locations.

The technique of step 21 thus enables the interpreter to calculate the time lag or time difference between points 36 and 37 in FIG. 3. From the known mute pattern (step 22 of FIG. 2), the lines 32 and 33 can be drawn in to show which offsets (traces) are included within the near-mute window. Similarly, lines 34 and 35 delineate the far-mute window.

The interpreter will typically not have information about a reflector such as 31 at more than two points such as 36 and 37. Because theory predicts NMO to be hyperbolic it is reasonable to expect RNMO (after NMO correction) to be hyperbolic as well. Such a hyperbolic reflection shape is illustrated in FIG. 3 by dotted line 38 connecting the two points 36 and 37 known to the interpreter. Theory predicts that such a hyperbola will have zero slope at zero offset. Alternatively, the interpreter might simply want to connect the two known points by a straight line 39. Looking at sample gathers (if available) may help the interpreter decide which reflection shape approximation is appropriate. (Step 23 of FIG. 2). (S)he might choose another shape such as a "hockey-stick" shape, known to occur when anisotropic effects are significant. However, such shapes usually become significant only beyond the far mute, and assume a detailed level of knowledge that may be beyond resolution.

After step 23, the interpreter has enough information to determine the travel times at which the selected reflection shape (38 or 39 in FIG. 3) intersects edges 34 and 35 of the far mute window. The time difference between the two intersection points can be called the far RNMO. Knowing the number of evenly spaced traces within the far mute, the time lags for the reflection event between each individual trace and a selected reference trace can be approximated. (Step 24) For example, if the mute pattern shows that the far mute window contains 9 traces, and the reference trace is taken to be the stacked trace (sum of the nine individual traces), then the middle ($5^{th}$) trace can be assumed to have zero time lag relative to the stacked trace (assuming the linear reflection shape), and the other traces can be assumed to be uniformly spaced in time by one-eighth of the far RNMO, with traces 6–9 lagging the stacked trace and traces 1–4 leading the stacked trace. The Appendix shows a preferred method for performing step 24 assuming the hyperbolic reflection shape.

For the same near-far time lag, it can be seen from FIG. 3 that the hyperbolic reflection shape assumption always results in a larger predicted far RNMO than the linear reflection shape assumption.

At step 25, the interference frequency for the far mute window is calculated. From FIGS. 1A–1D, it is clear that the higher the seismic frequency, the greater the potential interference and hence amplitude error. One way to characterise the interference frequency on a point-by-point basis is to calculate the instantaneous frequency. Sheriff defines "instantaneous frequency" as "the frequency of the complex sinusoid that locally best fits a complex trace." There are numerous commercial software packages that can calculate instantaneous frequency, for example the product called GeoQuest IESX marketed by GeoQuest, a division of Schlumberger Technology, 5599 San Felipe, Houston, Tex. 77056-2722.

For the horizon-based case, interference frequency may be simply estimated by calculating the time difference between peaks and troughs adjacent to the horizon of interest. This time difference is half the seismic cycle period. Seismic frequencies are typically in the range 20–60 Hz.

After step 25, the interpreter has all of the information needed to calculate an amplitude compensation factor. A simple example of a far mute with three traces will serve to indicate how a preferred compensation formula is derived. Traces are approximated by sinusoids of frequency f that are, in the linear reflection shape assumption, uniformly spaced by $\Delta t$ from one another (due to RNMO). Thus the stacked trace, (sum of the three sinusoids) is in phase with the second, or middle, trace. Each trace is assumed to have unit amplitude. Adding (stacking) the three traces yields.

$$\cos[2\pi f(t-\Delta t)] + \cos 2\pi f t + \cos[2\pi f(t+\Delta t)] \quad (1)$$

Evaluating this stack wave function at t=0 will, by inspection, yield the maximum value, or stack amplitude:

$$\cos(-2\pi f \Delta t) + 1 + \cos[2\pi f \Delta t] \quad (2)$$

Since cosine is an even function, expression (2) reduces to $$1 + 2\cos 2\pi f \Delta t \quad (3)$$

For small $\Delta t$ compared to the period (1/f), the stack amplitude is close to, but less than, 3, since the slight phase lags cause some destructive interference. The compensation factor F that will correct this stack amplitude to what it would be with zero RNMO is $$F = \frac{3}{1 + 2\cos 2\pi f \Delta t} \quad (4)$$

Generalising this formula for N traces in the far mute, $$F = \frac{N}{\sum_{i=1}^{N} \cos(2\pi f \Delta t_i)} \quad (5)$$

where $\Delta t_i$ is the time difference between the ith trace and the stacked trace estimated in step 24. The frequency, f, is the interference frequency calculated in step 25, and N and is known from the mute pattern which was input in step 22.

In practice, this calculation of compensation factor F is performed for every point in the data set, thus producing a map or volume of factors that vary throughout spatially. (Step 26) The original volume (or map) of amplitudes is multiplied by the corresponding set of compensation factors F to get a compensated far volume (or map). (Step 28) Equation (5) may equally be used to generate compensation factors for the near-stack amplitudes in cases where the near-stack amplitude error is not negligible.

Figure 4:
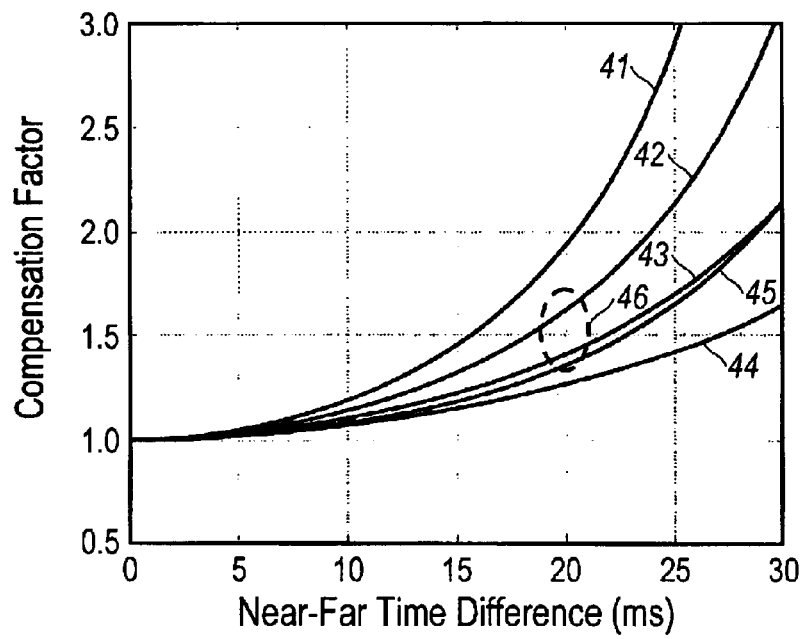
FIG. 4 shows how the amplitude compensation factor in one embodiment of the present invention varies with the near-to-far time lag, the RNMO shape, and the dominant frequency for a given mute pattern.

FIG. 4 illustrates how the amplitude compensation factor of equation (5) varies with near-to-far time difference (calculated in step 21) for different interference frequencies and reflection shape assumptions, and for a mute pattern in which the far stack includes 9 traces centered around trace No. 23 and trace No. 8 is the middle trace for the near stack. The hyperbolic reflection shape assumption was used to generate curves 41–44, each with a different interference frequency: 40 Hz for curve 41, 35 Hz for curve 42, 30 Hz for curve 43, and 25 Hz for curve 44. Curve 45 was generated with a linear reflection shape assumption and a frequency of 35 Hz. For a typical 30–35 Hz reflection that has a 20 ms near-to-far lag, the amplitude error is about 50% (highlighted by oval 46).

In summary, FIG. 4 shows that equation (5) behaves as expected. At zero near-to-far time lag (perfect flatness), there is no destructive interference and hence no amplitude error. As the near-to-far time lag increases, the error increases, and at a greater rate for higher frequencies than for lower frequencies.

It will be obvious to the person of ordinary skill in the art that variations or refinements of equation (5) may be used. All such formulas should produce results similar to FIG. 4. Such alternative amplitude compensation formulas provide alternative embodiments of the present invention.

In its fullest utilization, the present invention is a data quality control ("QC") analysis method. For QC analysis, the amplitude compensation results should be viewed as quantified amplitude error estimation that aids in deciding whether the data should be reprocessed. If processing is not warranted (F reasonably close to unity), or if reprocessing is not possible, the present inventive method can then be used as described above to correct the amplitude of far volumes and maps, thereby providing better input to any seismic attribute applications where accurate seismic amplitudes are important, including AVO attributes.

There are several assumptions in the present inventive method that can greatly influence the result:

1. The calculated near-to-far time difference is correct. The lag volume and/or the seismic interpretation must be accurate and all polarity reversals must be handled correctly. Accurate time alignment (volume-based mode) and interpretation are important in the present invention. Interpretation is most important in the map-based embodiments of the invention, since the maps represent exercises of the interpreter's judgement. However, the horizon-constrained method for calculating the near-to-far time difference in volume- based embodiments also involves a certain degree of interpretation.
2. The selected reflection shape is a good fit. The reflection shape assumption, whether hyperbolic, linear or other, can significantly affect results as the divergence between curves 42 and 45 in FIG. 4 illustrates. As stated previously, examining available gathers within the area of analysis may help to decide which approximation should be used.
3. The seismic data can be characterized by a periodic function. In most embodiments of the present invention, a related assumption is that the periodic function is a sinusoid. However, that limitation is not essential. Compensation factors may be computed based on other wavelet shapes.
4. There are no significant changes in amplitude with offset (or angle). In deriving equation (5), an implicit assumption is that the amplitude of the sinusoid used to approximate each trace in the far mute window does not change. As a practical matter, this assumption will tend to be true unless there is a polarity reversal in the middle of the far mute window.

With respect to the problem of a polarity reversal in the far mute window, (assumption 4 above), if this happens, the interpreter will not normally know that it is occurring. The present invention will be compensating for something that is not a processing error but instead is a real geologic effect. However, polarity reversals typically occur in regions where the seismic amplitude is small, minimizing the impact of the corrections being applied. Also, such polarity reversals are more characteristic of non-reservoir rocks and therefore rarely impact typical areas of interest.

Because of these assumptions, the present inventive method is preferably applied with frequent quality control checks. Spatial smoothing is recommended throughout the procedure to reduce the effects of random noise. Furthermore, if some of the input data are questionable (e.g. interference frequency, mute pattern), it is often better to use a single value for the entire area. The results in such cases may not be as accurate, but the compensation factor will be a more robust estimate of the amplitude error.

As a further QC check, AVO attributes (e.g., A vs. B crossplots, A+B volumes) should preferably be calculated both from the original and the compensated data. These AVO products and the far volumes should be carefully analyzed to see if the compensation changed the data significantly. Such changes will influence amplitude-based predictions of lithology and fluid presence. The present invention is an estimation method and is not accurate enough to reliably justify AVO predictions based on large amplitude compensations.

At step 27 of FIG. 2, the magnitude of the compensation factor is assessed. If the amplitude error is much less than 20%, the original data are probably acceptable and no compensation is needed. If the average compensation factor is moderate but still below ~1.2 (i.e., less than 20% amplitude error), then the compensated data (step 28) is probably adequate for quantitative amplitude analysis. For larger amplitude errors (~20%–50%), there may be a more significant effect on AVO, and therefore the data would best be reprocessed. However, the corrected (by the present invention) volumes and maps have better amplitude fidelity than the original data. If reprocessing is not an option and the available gathers show well behaved, predictable RNMO, amplitude compensation by the present inventive method does allow quantitative AVO work to be done on data that could not otherwise be used.

FIG. 4 shows that uncertainties related to amplitude compensation increase with the near-to-far time lag, since the choice of reflection shape approximation becomes more significant. In addition, large RNMO (more than a cycle) may indicate that other data integrity problems exist beyond simply a decreased amplitude. Therefore, if the compensation factors for an area are consistently above ~1.5, the compensated far amplitudes may still be significantly different from the true amplitudes. In such instances, data reprocessing is required, and the compensated far amplitudes should not be used for quantitative AVO or other amplitude analysis.

Example Application

The present invention was applied to a seismic dataset that contained non-flat gathers before the creation of near and far stacks. FIGS. 5–8 illustrate application of elements of the present inventive method in the order that a seismic interpreter would proceed in a volume-based mode. The original data were also reprocessed to correct the RNMO (gathers flattened and restacked with the same mute pattern), with the objective being to create a perfectly processed comparison dataset. FIGS. 9–11C compare the far amplitudes and the AVO response of the original data to the compensated and reprocessed data.

The datasets are compared using conventional interpretation techniques. The top of the reservoir (FIGS. 5 and 7A–C) was interpreted on all three datasets, the horizons snapped, and the results crossplotted (FIGS. 9–11C).

The compensated data and the reprocessed data show very similar far amplitude values, and therefore AVO responses. This indicates that the compensation by the present inventive method can yield comparable results to true seismic reprocessing. A more detailed discussion follows.

Figure 5:
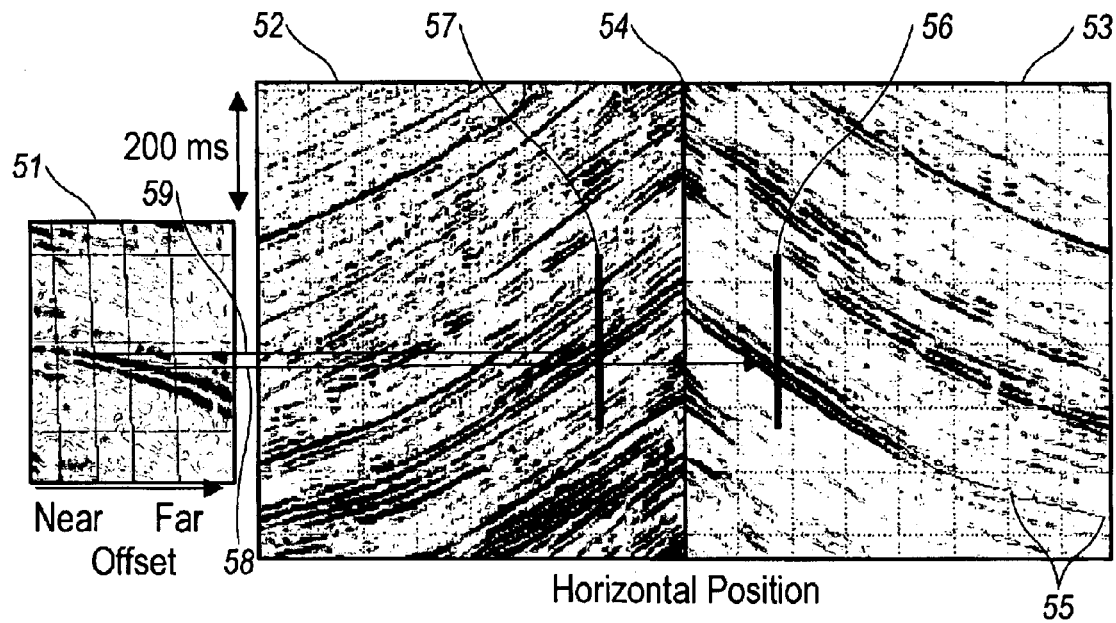
FIG. 5 shows a typical seismic gather plus near and far 2-D sections taken for example purposes from actual seismic data.

FIG. 5 shows a typical gather 51 of seismic traces and the stack amplitudes for the near partial stack 52 and the far partial stack 53 from actual seismic data. Displays 52 and 53 are called seismic sections, defined by Sheriff as "a plot of seismic data along a line." The vertical axis represents two-way travel time. The horizontal axis is spatial position for the stacks and offset for the gather. The magnitude of the seismic amplitudes is indicated by color with red denoting the largest negative amplitudes (troughs) and black denoting the largest positive amplitudes (peaks). A more quantitative scale for FIG. 5 is provided by the color bar in FIG. 8. The far stack profile 53 is displayed in reversed direction for easier comparison. Position 54 is the same spatial location in each stack. The peaks and troughs obviously do not match up along line 54. The example gather 51 shows large RNMO (i.e., the NMO correction has not flattened the reflections). The RNMO causes the misalignment between the near and far data volumes 52 and 53, i.e., the failure of the peaks and troughs to match up along line 54. The interpreter has drawn a line (55) along the red trough that he believes represents the reflection from the top of a reservoir and thus suggests to the interpreter the shape and location of that reservoir. Lines 56 and 57 mark the same horizontal position in the near and far stacks. Line 58 denotes the top of the reservoir at that horizontal position in the far stack 53 and line 59 denotes the reservoir top at the same horizontal position in the near stack 52. From the vertical travel time scale, it can be seen that the time difference between lines 58 and 59 (the time lag of the far stack relative to the near stack) is approximately 25 ms. The intersection of lines 58 and 59 with the prominent red reflection in gather 51 shows the same effect in terms of RNMO. Frequently, gathers will not be available to the seismic interpreter. The better reflector shape approximation in the case of gather 51 is hyperbolic.

FIG. 6 is the mute pattern used for the present example. The near mute window boundaries are lines 61 and 62, and the far mute is between lines 63 and 64. Mute boundaries are not vertical lines in offset gathers since the angle at which energy arrives at a receiver depends on how deep that energy has travelled. So, although the broken lines 61–64 do not follow constant offsets (measured by trace number) with depth, they do represent the same ray angle throughout the depth range. The mute pattern used in FIG. 4 would approximately correspond to a depth slice from FIG. 6 at approximately 2100 ms.

FIG. 7A shows the lag volume (step 21 of FIG. 2) calculated for the present example, using the Eastwood time-alignment method. FIG. 7B shows the instantaneous frequency, used to represent the interference frequency of the far volume (step 25). FIG. 7C shows the compensation factor (step 26). All three data volume cross sections were calculated along the profile shown in FIG. 5. Line 71 is the interpreter's pick for the top reservoir horizon. The color bars below each figure show the scale for the depiction of lag time (near-to-far time differences) in units of 4 ms, frequency in Hz, and correction factor in FIGS. 7A, 7B and 7C, respectively. The horizontal axis in each figure is horizontal location along the seismic profile. The vertical axis is two-way travel time. In FIG. 7A, the lag along the top of reservoir horizon 71 increases from 8 ms to over 20 ms. FIG. 7B shows that 25–30 Hz is a good estimate for the interference frequency along the horizon. FIG. 7C shows the corresponding amplitude error is at most 50%–60%. (A compensation factor of 1.50 means that the amplitude is two thirds of its correct magnitude.) Both the lag and, to a lesser degree, the frequency vary with position along the profile, and hence the compensation factor varies too. Horizontal direction along the seismic profile is reversed in FIG. 7C for display and comparison purposes.

FIG. 8 shows, on the left, the same original far section shown on the right in FIG. 5, compared to (on the right side of FIG. 8) the corrected data after applying the compensation factors from FIG. 7C. The compensated far section is reversed as in FIG. 5 such that the line 81 is the same location in both. The amplitude boost from applying the present inventive method is apparent. For example, the red trough 82 corresponding to the reservoir top is more prominent, as are the adjacent (black) peaks.

Amplitudes were extracted along a survey line from the top-of-reservoir interpretation, and the results are shown in FIG. 9. Curve 91 represents the original amplitudes, curve 92 represents the amplitudes after compensation by the present inventive method, and curve 93 represents the amplitudes after reprocessing. Curve 94 shows the near-to-far stack time differences along the same interpretation. The lag time values in milliseconds may be read from the amplitude scale by dividing by 100. As expected under the theory that destructive interference from RNMO greatly influences stacked amplitudes, all three amplitude curves are nearly the same where the time lag is small, e.g., less than 15 ms. The original (91) and compensated (92) curves coincide almost completely for small lags. The small differences compared to the reprocessed curve 93 are due to the fact that different processing runs will introduce different amounts of random noise. For time lags in the 20–25 ms range, the reprocessed (93) and compensated (92) data have very similar amplitudes, both significantly larger than the original (91) data; the compensated amplitude is randomly both higher and lower than the reprocessed, with the random differences again due to small differences in the two processing flows.

Figure 10A:
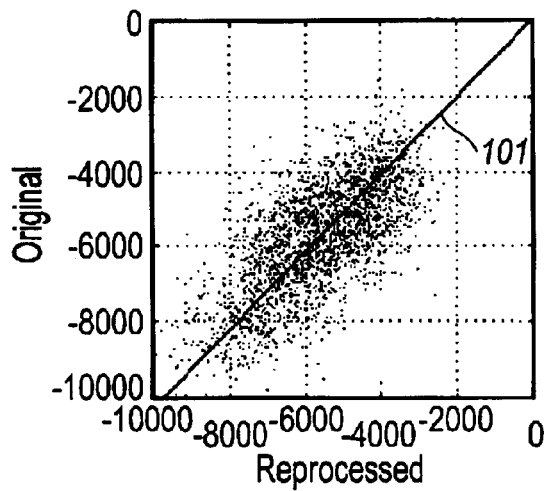
FIGS. 10A, 10B, 10C and 10D are amplitude cross-plots obtained from a small test area in FIG. 5 comparing original, compensated and reprocessed data.
Figure 10B:
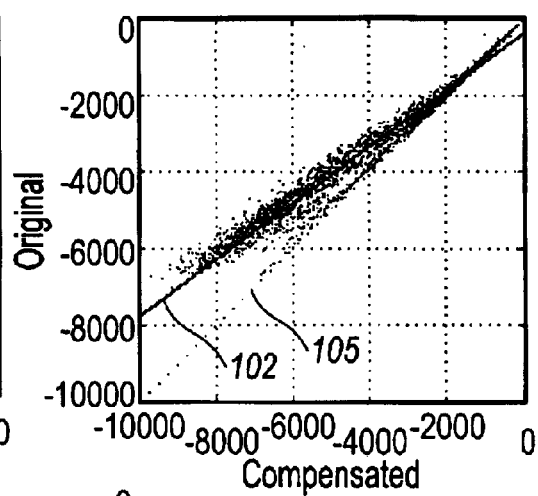
Figure 10D:
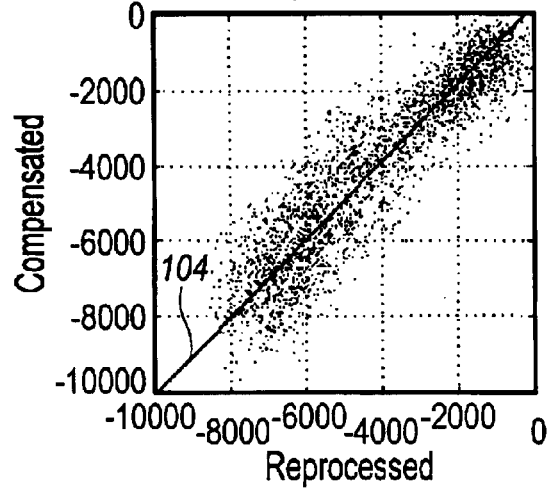
Figure 10C:
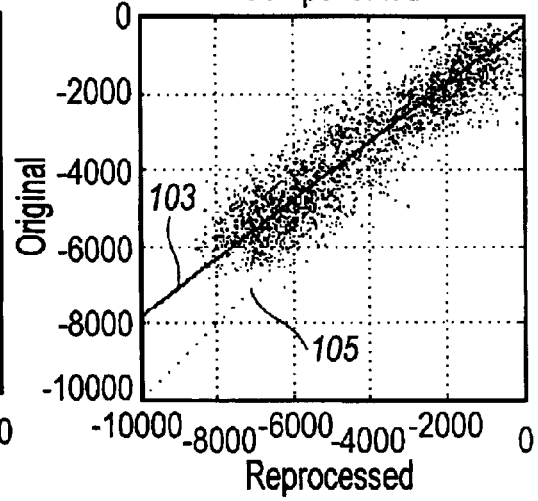

FIGS. 10A–10D are comparisons of "snapped" amplitudes extracted from the reservoir top surface horizon interpretation within a small test area approximately 20 by 200 traces in size. The term "snapped" refers to the procedure of moving an interpretation to the nearest peak or trough amplitude in an automated fashion. The original, compensated and reprocessed amplitudes are cross-plotted in four combinations. FIG. 10A shows near stack amplitudes, and the other three figures show far stack amplitudes. All figures involving reprocessed data (FIGS. 10A, 10C and 10D) display more random noise than the crossplot of original and compensated data in FIG. 10B because two different processing runs are being compared, each with somewhat different random noise. The solid lines 101, 102, 103 and 104 are linear fits to the plotted points. Both reprocessed and compensated far amplitudes exhibit a bias when plotted against the original amplitudes, caused by the amplitude error in the far stack. (FIGS. 10B and 10C). This can be seen in the RMA lines 102 and 103 which do not pass through the origin and do not have a slope of unity (unit slope indicated by dotted line 105). Lines 102 and 103 each have a significantly lower slope than that of line 105—a direct result of the ~20% amplitude difference in the far volume. Comparison of lines 102 and 103 provides a measure of how well amplitude compensation by the present inventive method compares with the carefully reprocessed amplitudes. An even more direct comparison is provided by FIG. 10D where the correlation between the compensated vs. reprocessed amplitudes is nearly one-to-one. In this example, the present inventive method handles lags as great as 20–25 ms and amplitude errors as great as 50–60%, thereby eliminating the need to perform expensive reprocessing.

The remaining figures provide similar tests and comparisons of the present inventive method using AVO attributes instead of amplitude data. FIGS. 11A–11C show crossplots of AVO attributes (slope, or gradient, vs. intercept) calculated from the reservoir top horizon local amplitude for the three datasets (original—FIG. 11A; compensated—FIG. 11B, and reprocessed—FIG. 11C). Comparing the three figures, the portion of the data that shifts when the original data is either compensated by the present inventive method or reprocessed is approximately bounded by oval 111. This anomaly falls in the positive gradient region in the original data (FIG. 11A), but due to the larger far amplitudes, moves into the negative gradient region in the compensated (FIG. 11B) and reprocessed (FIG. 11C) results. The similarity between FIGS. 11B and 11C provides a measure of the effectiveness of the present inventive method.

The foregoing description is directed to particular embodiments of the present invention for the purpose of illustrating the invention. It will be apparent, however, to one skilled in the art that many modifications and variations to the embodiments described herein are possible. For example, the invention has been described in the context of two-offset data and using a sinusoid seismic waveform. It will be obvious to the person skilled in the art how to extend the invention to work on more than two partial stacks representing different offset windows, and assuming more complex waveforms for the seismic traces. Availability of more than two stacks may help in determining the best reflection shape approximations. Similarly, the present invention corrects for all gather non-flatness, whether caused by RNMO or due to other causes (e.g., velocity error or anisotropy). Accordingly the term residual normal moveout as used in the appended claims will be understood to include gather non-flatness regardless of cause. In the same vein, the time differences referred to in this description and in the appended claims will be understood in mean depth differences in the case of depth-migrated seismic data. All such modifications and variations are intended to be within the scope of the present invention, as defined in the appended claims.

Appendix

A method for calculating the time difference $\Delta t$, between the time $t_i$ for i'th trace in a partial stack and the time $t_0$ for some selected reference trace in the partial stack, where the hyperbolic reflection shape is assumed, is as follows:

The equation for a hyperbolic moveout curve where x is the trace number (or angle or spatial/horizontal location) and t is two-way travel time can be expressed as $$\frac{t^2}{a^2} - \frac{x^2}{b^2} = 1. \tag{A1}$$

This equation is a pair of hyperbolas symmetric about both axes with t-intercepts (vertices) at $\pm a$. Selecting the upper branch ($t \geq a$) of the hyperbola for convenience, the boundary conditions are that the curve must pass through two known points, $(x_1, t_1)$ and $(x_2, t_2)$. These two points are the near-stack point and the far-stack point, illustrated by points 36 and 37 in FIG. 3. Normally, the constants a and b could be readily obtained by substituting $(x_1, t_1)$ and $(x_2, t_2)$ into equation (A1) and solving the resulting two simultaneous equations for a and b. As stated previously, however, the interpreter will typically know $x_1$ and $x_2$, but will know only the difference between $t_1$ and $t_2$. (S)he will not know $t_1$ and $t_2$ separately.

Nevertheless, an arbitrary value of the constant a may be selected. The constant b may then be determined such that it yields the known value of $t_2 - t_1$ for the known x-values $x_1$ and $x_2$. This is done by solving equation (A1) for t and then finding $$\Delta t = t_1 - t_2 = a\sqrt{\frac{x_1^2}{b^2}+1} - a\sqrt{\frac{x_2^2}{b^2}+1}. \quad (A2)$$

Since $\Delta t$, $x_1$, $x_2$, and a are known, equation (A2) may be solved for the constant b corresponding to the value of a selected.

With a and b now determined, equation (A2) may be used to calculate the difference $\Delta t_i = t_i - t_0$ between the i'th trace in either partial stack and the selected reference trace in that partial stack. One merely changes the subscripts 1 and 2 in equation (A2) to i and 0. Choosing a different value of a merely slides the hyperbola up or down on the t-axis and will not affect the time difference between any two given values of x.

We claim:

1. A method for estimating amplitude error in seismic data due to residual normal moveout time differences, comprising the steps of:

a) obtaining a near-offset partial stack ("near stack") and a far-offset partial stack ("far stack") from the seismic data, and the mute pattern used to define the near and far stacks, said mute pattern including the number of seismic traces in each partial stack;

b) calculating the time differences between the far stack and the near stack;

c) selecting a reflection shape approximation for the residual normal moveout;

d) using the time difference between far and near stacks, the reflection shape approximation, and the mute pattern to calculate the time differences between individual traces in the far stack and a reference trace;

e) calculating an interference frequency and selecting a waveform for the traces in the far stack;

f) determining an amplitude compensation formula for the far stack using the results of steps (d) and (e); and g) using the amplitude compensation formula to calculate the error in the far-stack amplitude.

2. The method of claim 1, further comprising, the step of using the amplitude compensation formula to correct far-stack amplitude when the amplitude error from step (g) is less than a preselected percentage.

3. The method of claim 1, wherein the waveform is a sinusoid with frequency equal to the interference frequency f, and the amplitude compensation formula is:

$$F = \frac{N}{\sum_{i=1}^{N} \cos(2\pi f \Delta t_i)}$$

where F is a multiplicative factor for compensating far stack amplitude for residual normal moveout;

N is the number of traces in the far stack; and $\Delta t_i$ is the time difference between the i'th trace in the far stack and the reference trace.

4. The method of claim 1, wherein the reflection shape approximation is hyperbolic.

5. The method of claim 1, where in the reflection shape approximation is linear.

6. The method of claim 1, wherein the seismic data are in the form of data volumes, the interference frequency is the instantaneous frequency, and the time difference between near and far stacks is found by the Eastwood time alignment method.

7. The method of claim 1, wherein the reference trace is obtained by combining the individual traces in the far stack.

8. The method of claim 1, wherein the seismic data are in the form of maps, the interference frequency is calculated from the time difference between adjacent peaks and troughs, and the time difference between near and far stacks is taken as the time difference between near and far interpreted horizons.

9. The method of claim 1, wherein amplitude error is also estimated in the near stack by performing the following additional steps:

(h) using the time difference between near and far stacks, the reflection shape approximation, and the mute pattern to calculate the time differences between individual traces in the near stack and a reference trace;

(i) calculating an interference frequency and selecting a waveform for the traces in the near stack;

(j) determining an amplitude compensation formula for the near stack using the results of steps (h) and (i); and (k) using the amplitude compensation formula from step (j) to calculate the error in the near stack amplitude.

10. A method for estimating amplitude error in seismic data due to residual normal moveout time differences, comprising the steps of:

a) obtaining a plurality of partial stacks from the seismic data representing different offset ranges, and the mute pattern used to define the offset ranges, said mute pattern including the number of traces in each stack;

b) selecting the stack with the smallest offset (the "near stack") and one of the other stacks;

c) calculating the time difference between the near stack and the other stack;

d) selecting a reflection shape approximation for the residual normal moveout;

e) using the time difference between the near stack and the other stack, the reflection shape approximation, and the mute pattern to calculate the time differences between individual traces in the other stack and a reference trace for the other stack;

f) calculating an interference frequency and selecting a waveform for the traces in the other stack;

g) determining an amplitude compensation formula for the other stack using the results of steps (e) and (f);

h) using the amplitude compensation formula to calculate the error in the stack amplitude for the other stack; and i) repeating steps (b)–(h) for each of the remaining other stacks.

11. The method of claim 10, wherein the waveform is a sinusoid with frequency equal to the interference frequency f, and the amplitude compensation formula is;

$$F = \frac{N}{\sum_{i=1}^{N} \cos(2\pi f \Delta t_i)}$$

where F is a multiplicative factor for compensating the stack amplitude for one of the other stacks for residual normal moveout;

N is the number of traces in the other stack; and $\Delta t_i$ is the time difference between the i'th trace in the other stack and the reference trace for the other stack.

* * * * *